United States Patent [19]

Tokarz

[11] 4,386,049
[45] May 31, 1983

[54] HIGH TEMPERATURE MEASURING DEVICE

[75] Inventor: Richard D. Tokarz, West Richland, Wash.

[73] Assignee: The United States of America as represented by the United States Department of Energy, Washington, D.C.

[21] Appl. No.: 229,497

[22] Filed: Jan. 29, 1981

[51] Int. Cl.³ ............................................. G01K 11/00
[52] U.S. Cl. .................................... 376/247; 116/216; 340/590; 374/106
[58] Field of Search ................. 376/245, 247; 73/358, 73/368, 368.1; 116/216, 217, 218, 220; 340/590, 591, 593; 374/106, 137

[56] References Cited

U.S. PATENT DOCUMENTS 2,753,270 7/1956 Renzo ................................ 116/216
2,909,925 10/1959 Myers ................................ 73/358
3,869,919 3/1975 Presser et al. ...................... 374/106

Primary Examiner—Richard A. Farley

[57] ABSTRACT

A temperature measuring device for very high design temperatures (to 2,000° C.). The device comprises a homogenous base structure preferably in the form of a sphere or cylinder. The base structure contains a large number of individual walled cells. The base structure has a decreasing coefficient of elasticity within the temperature range being monitored. A predetermined quantity of inert gas is confined within each cell. The cells are dimensionally stable at the normal working temperature of the device. Increases in gaseous pressure within the cells will permanently deform the cell walls at temperatures within the high temperature range to be measured. Such deformation can be correlated to temperature by calibrating similarly constructed devices under known time and temperature conditions.

7 Claims, 6 Drawing Figures

HIGH TEMPERATURE MEASURING DEVICE

The U.S. government has rights in this invention pursuant to Contract No. EY-76-C-06-1830 between the U.S. Department of Energy and Battelle Memorial Institute.

BACKGROUND OF THE INVENTION

This invention arose from the need for measurement of very high temperatures (to 2,000° C.) in very hostile environments. A typical application might be within the environment existing within a nuclear test bundle during a simulated loss of cooling accident. Loss of coolant accident tests are specified for discrete high temperature excursions for short time periods. Practical devices must be utilized to monitor temperatures that exist at various locations within nuclear fuel test bundles under such test conditions.

The purpose of the present device is to measure the highest temperature achieved at discrete locations that are being monitored during high temperature procedures. The device is adapted for measuring such temperatures at very high design temperature ranges within a system that is normally maintained at a substantially lower working temperature. For instance, in nuclear reactor tests where temperatures being monitored might range to 2000° C., the normal temperature of a working reactor environment is maintained at or below 260° C. There is a substantial difference between the normal working temperature and the elevated design temperature range within which measurement is required.

SUMMARY OF THE INVENTION

The temperature measuring device comprises a homogenous base structure that contains a plurality of individual walled cells. The base structure is made from a material having a progressively decreasing coefficient of elasticity within the elevated design temperature range. Its elastic limit is preferably above the design temperature range, but can be selected at a specific temperature for monitoring of conditions at such temperature. A predetermined quantity of inert material is confined within the walls of each cell within the base structure. These cells are dimensionally stable while confining the inert material at the working temperature, but the quantity of inert material has a gaseous pressure which permanently deforms the confining cell walls at cell temperatures within the design temperature range.

It is a first object of the invention to provide a high temperature measuring device having no moving parts or elements which might malfunction under conditions of high temperature and pressure within a hostile environment.

Another object of the invention is to provide a temperature measuring device that does not require electrical leads or other external connections for its operation or monitoring of temperature.

Another object of the invention is to provide a temperature measuring device which can be made in very small sizes for insertion within equipment without requiring any modification of the equipment or provision of substantial space within which it is fitted.

DESCRIPTION OF THE PREFERRED EMBODIMENTS

Figure 1:
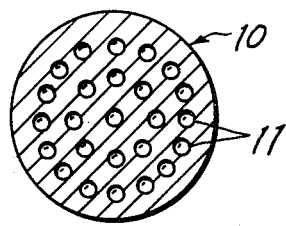
FIG. 1 is a sectional view through a first spherical form of the invention.
Figure 2:
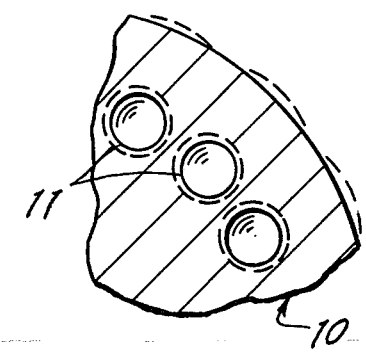
FIG. 2 is an enlarged fragmentary view through a portion of the section area shown in FIG. 1.

A first form of the invention is shown in FIGS. 1 and 2. It is illustrated as a spherical ball made of a metal alloy or inorganic material capable of withstanding the temperatures and environments in which it is designed to be used. The spherical base structure 10 is homogenous throughout the sphere. Its interior contains a plurality of individual walled cells 11 that are identical in size and shape and contain an inert gas at high pressure. The base structure 10 is made from a material having a progressively decreasing coefficient of elasticity within the design temperature range to be monitored. Therefore, the elasticity of the base structure will decrease at such elevated temperatures. The elastic limit of the material used in the fabrication of the base structure 10 must be above the design temperature range to be measured. The elastic limit of the material can further be used as an ultimate indication of temperature measurement. This will be described below.

The structure of the sphere is stable at lower temperatures, since the nature of the material comprising it is selected so as to be dimensionally stable while confining the inert material within cells 11 at the normal working temperature of the equipment being monitored. However, the inert material has a gaseous pressure which permanently deforms the confining cell walls at cell temperatures within the design temperature range. As the temperature of the base structure 10 is elevated, its coefficient of elasticity is progressively decreased and the internal pressure of the gas within cells 11 increases. The resulting increased interior stress will cause permanent deformation of the original exterior shape of each sphere.

The amount of deformation can be directly related to the highest temperature to which the sphere has been exposed if the exposure time is known. FIG. 2 graphically illustrates the expansion of the cells and resulting deformation of the exterior spherical surfaces by showing the resulting deformed surface areas in dashed lines.

Figure 3:
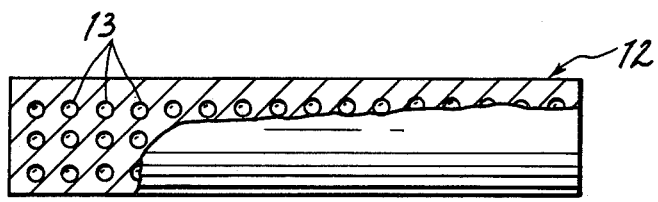
FIG. 3 is a longitudinal sectional view through a cylindrical embodiment of the invention.
Figure 4:
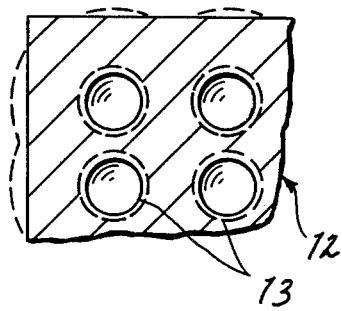
FIG. 4 is an enlarged fragmentary view of the portion of the section area shown in FIG. 3.

FIGS. 3 and 4 illustrate a similar device in the form of a short rod, again having a metal alloy or inorganic base structure 12 and a plurality of closed interior cells 13. As shown in FIG. 4, deformation indicated by dashed lines will result when such a structure is exposed to the elevated design temperatures. However, in the case of a rod, the time duration can be extended by subsequent measurement of the change in length of the rod versus its change in diameter since the driving forces and their restraining counterparts are different in these two directions when subject to differing temperatures in a time dependent mode.

The above discussion assumes that the monitored temperatures will be at or below the elastic limit of the material comprising the base structure 10 or 12. Should the device be subjected to temperatures above this elastic limit, the expansion that results in the device will relate more to the ultimate temperature achieved and less to the time exposure of the device. For most accurate correlation of deformation to temperature, the base structure of the device should be constructed from a material having a wide temperature range wherein the base structure is elastic.

Figure 5:
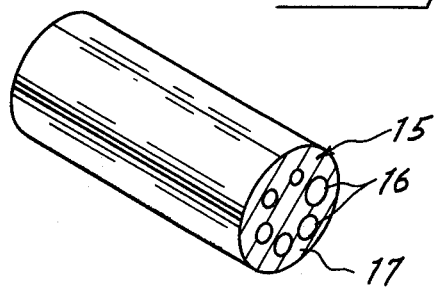
FIG. 5 is a perspective section view through a modified cylindrical form of the invention.
Figure 6:
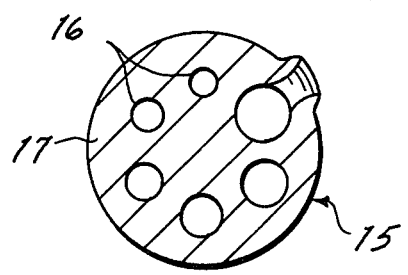
FIG. 6 is an enlarged transverse sectional view taken through the device illustrated in FIG. 5.

FIGS. 5 and 6 show a modification which allows more definitive temperature determination. One method of fabrication of this embodiment would be to preform a billet in the form of a micropore metal filter. This can be accomplished by casting the base structure material around micron sized rods of a second material and subsequently etching the second material to remove it. Such a process will leave the base structure material with micron sized holes through it in a predetermined pattern. The ends of the billet can subsequently be sealed by crushing or welding them to fix the volume within each elongated cell. The spacing of the gas filled cells can be accurately determined by such casting process. If the billet is subsequently compressed longitudinally of these holes, this will add the needed internal pressure to the rod.

Carrying this a little further as shown in FIGS. 5 and 6, the elongated holes can be arranged in a row adjacent an outer edge or adjacent the cylindrical surface of the billet 15. The sizes of the individual pores or elongated holes 16 can be gradually increased about the row of holes. The longitudinally extended center line of each hole can be equally spaced from the exterior cylindrical surface of the base structure 17. This results in a single rod with a series of elongated cells or cavities of different volumes but equal interior gas pressure. Because of the different sizes of the cavities, they would have different thicknesses of base metal between the cavity and the outer diameter of the rod.

When the temperature within the cells exceed a design temperature selected for the device, the wall between the largest cell and the outside surface of the rod 15 would expand first. As temperature increased further, each successively smaller cell would begin to expand. Within the range of design temperature, the first and largest cell might actually rupture as shown in dashed lines in FIG. 6. The determination of the highest temperature sensed by the rod 15 would be determined by the number of cavities which had expanded or ruptured the outer surface of the rod 15.

Any of the above devices can be formed from an acceptable base metal or alloy or an inorganic compound which can be sintered. The internal gas cells could be formed by hollow ceramic spheres or other void bearing materials, or by inclusion of solid materials which would be in the gaseous state at the intended temperature.

After enclosing the hollow spheres or other void bearing materials within the powdered or granulated base material, the entire combination is subjected to high impact forming by known processes. This will result in the material described above with respect to FIGS. 1 through 4, wherein the form of a rod or ball is produced with discrete pockets or cells of gas at very high pressure. The plurality of discrete pockets provides a more uniform stress over the entire surface of the device than would be possible with a single cavity at high pressure. This assures more predictable and uniform structural alteration and minimizes the characteristic rupture which could occur with a single cell cavity.

The devices are preferably constructed in small diameter balls or rods which can be located in large numbers alongside equipment whose temperature is to be monitored. An example would be fuel rods in an operating or test reactor. The spheres or rods would be located at chosen spatial intervals along the test bundle of fuel rods. After the test is completed, the spheres or rods could be recovered and measured either by precision diametrical measurements and length changes or by density changes.

Another method for measuring ultimate temperature sensed by such device would be to section the device and measure the size of the voids or cells in the center of the base structure material. This could then be compared to identical cells subjected to known time and temperature patterns in an oven.

I claim:

1. A temperature measuring device for indicating temperature during short time periods at a very high design temperature range at discrete locations within a system normally maintained at a working temperature substantially lower than the design temperature range; said apparatus comprising:
   a homogenous base structure containing a plurality of individual walled cells, the base structure being made from a material having a progressively decreasing coefficient of elasticity within the design temperature range, the elastic limit of the material being above the design temperature range;
   and a predetermined quantity of inert material confined within the walls of each cell within the base structure;
   the cells of said base structure being dimensionally stable while confining the inert material at the working temperature;
   said inert material within a cell having a gaseous pressure which permanently deforms the confining cell walls at cell temperatures within the design temperature range.

2. A temperature measuring device as claimed in claim 1, having an exterior spherical surface configuration.

3. A temperature measuring device as claimed in claim 1, having an exterior cylindrical surface configuration.

4. A temperature measuring device as claimed in claim 1, wherein the inert material is solid at the working temperature and gaseous at temperatures within the design temperature range.

5. A temperature measuring device as claimed in claim 1 wherein the cells each are identical in size.

6. A temperature measuring device as claimed in claim 1 wherein the cells each are identical in size and are uniformly distributed through the device.

7. A temperature measuring device as claimed in claim 1 wherein the cells have a progression of sizes and are arranged in a row with the centers of the respective cell walls equally spaced from an exterior surface of the base structure.

* * * * *